(12) United States Patent
Fischer et al.

(10) Patent No.: US 11,059,925 B2
(45) Date of Patent: Jul. 13, 2021

(54) METHOD AND SYSTEM FOR PRODUCING A POLYMER

(71) Applicant: INEOS STYROLUTION GROUP GMBH, Frankfurt am Main (DE)

(72) Inventors: Wolfgang Fischer, Walldorf (DE); Peter Ittemann, Dannstadt-Schauernheim (DE); Florian Patcas, Ludwigshafen (DE); Michael Ruf, Schwetzingen (DE); Rainer Moors, Germersheim (DE); Thorsten Schnabel, Dormagen (DE)

(73) Assignee: INEOS STYROLUTION GROUP, Frankfurt am Main (DE)

( * ) Notice: Subject to any disclaimer, the term of this patent is extended or adjusted under 35 U.S.C. 154(b) by 226 days.

(21) Appl. No.: 16/330,203

(22) PCT Filed: Sep. 5, 2017

(86) PCT No.: PCT/EP2017/072164
§ 371 (c)(1),
(2) Date: Mar. 4, 2019

(87) PCT Pub. No.: WO2018/046467
PCT Pub. Date: Mar. 15, 2018

(65) Prior Publication Data
US 2019/0211126 A1    Jul. 11, 2019

(30) Foreign Application Priority Data
Sep. 6, 2016  (EP) ..................................... 16187330

(51) Int. Cl.
*C08F 220/44*  (2006.01)
*C08F 212/08*  (2006.01)
(Continued)

(52) U.S. Cl.
CPC ......... *C08F 220/44* (2013.01); *B01J 19/0013* (2013.01); *B01J 19/06* (2013.01);
(Continued)

(58) Field of Classification Search
USPC .......................... 526/68, 329.2, 342; 422/138
See application file for complete search history.

(56) References Cited

U.S. PATENT DOCUMENTS

| 3,825,512 A | 7/1974 | Reiter et al. |
| 3,891,603 A | 6/1975 | Heil et al. |

(Continued)

FOREIGN PATENT DOCUMENTS

| EP | 0865820 A1 | 3/1998 |
| EP | 1297038 B1 | 8/2006 |
| EP | 2802619 B1 | 12/2012 |

OTHER PUBLICATIONS

English translation of International Preliminary Report on Patentability in International Application No. PCT/EP2017/072164, dated Mar. 14, 2019.

*Primary Examiner* — Fred M Teskin
(74) *Attorney, Agent, or Firm* — J.A. Lindeman & Co. PLLC

(57) ABSTRACT

The invention relates to a method for producing a polymer from a first component and a second component by means of a reactor (50), wherein reaction heat in the reactor (50) is discharged via an evaporative cooler (40), wherein gaseous exhaust vapour in the reactor (50) is supplied to the evaporative cooler (40), and condensed exhaust vapour is guided from the evaporative cooler (40) back into the reactor (50). In this way, the first component and/or second component are supplied at least partially via the evaporative cooler (40) and moved from the evaporative cooler (40) into the reactor (50). The invention also relates to a system for producing a polymer, comprising a reactor (50) and an evaporative
(Continued)

cooler (40) for discharging reaction heat in the reactor (50). In addition, the evaporative cooler (40) has at least one filling opening (46) for filling in the first and/or second component.

13 Claims, 1 Drawing Sheet

(51) Int. Cl.

| | |
|---|---|
| *C08F 210/10* | (2006.01) |
| *C08F 210/12* | (2006.01) |
| *B01J 19/18* | (2006.01) |
| *B01J 19/24* | (2006.01) |
| *B01J 19/00* | (2006.01) |
| *B01J 19/06* | (2006.01) |
| *C08F 220/18* | (2006.01) |
| *C08F 212/10* | (2006.01) |
| *C08F 212/12* | (2006.01) |

(52) U.S. Cl.
CPC ........... *B01J 19/18* (2013.01); *B01J 19/2425* (2013.01); *C08F 212/08* (2013.01); *C08F 212/10* (2013.01); *C08F 212/12* (2013.01); *C08F 220/18* (2013.01); *B01J 2219/00085* (2013.01); *B01J 2219/00103* (2013.01); *B01J 2219/00123* (2013.01); *B01J 2219/00128* (2013.01)

(56) References Cited

U.S. PATENT DOCUMENTS

| | | | |
|---|---|---|---|
| 4,555,384 A | | 11/1985 | Morris et al. |
| 4,657,994 A | | 4/1987 | Tanaka et al. |
| 4,874,829 A | * | 10/1989 | Schwier ............... C08F 212/12 |
| | | | 526/262 |
| 5,739,219 A | * | 4/1998 | Fischer ................. B01J 19/242 |
| | | | 526/64 |
| 5,980,790 A | * | 11/1999 | Kuwahara ............... B29C 48/40 |
| | | | 264/37.13 |
| 6,428,199 B1 | | 8/2002 | Rupaner et al. |
| 9,249,290 B2 | | 2/2016 | Ittemann et al. |
| 2002/0176812 A1 | * | 11/2002 | Takai .................... C08F 210/02 |
| | | | 422/131 |

* cited by examiner

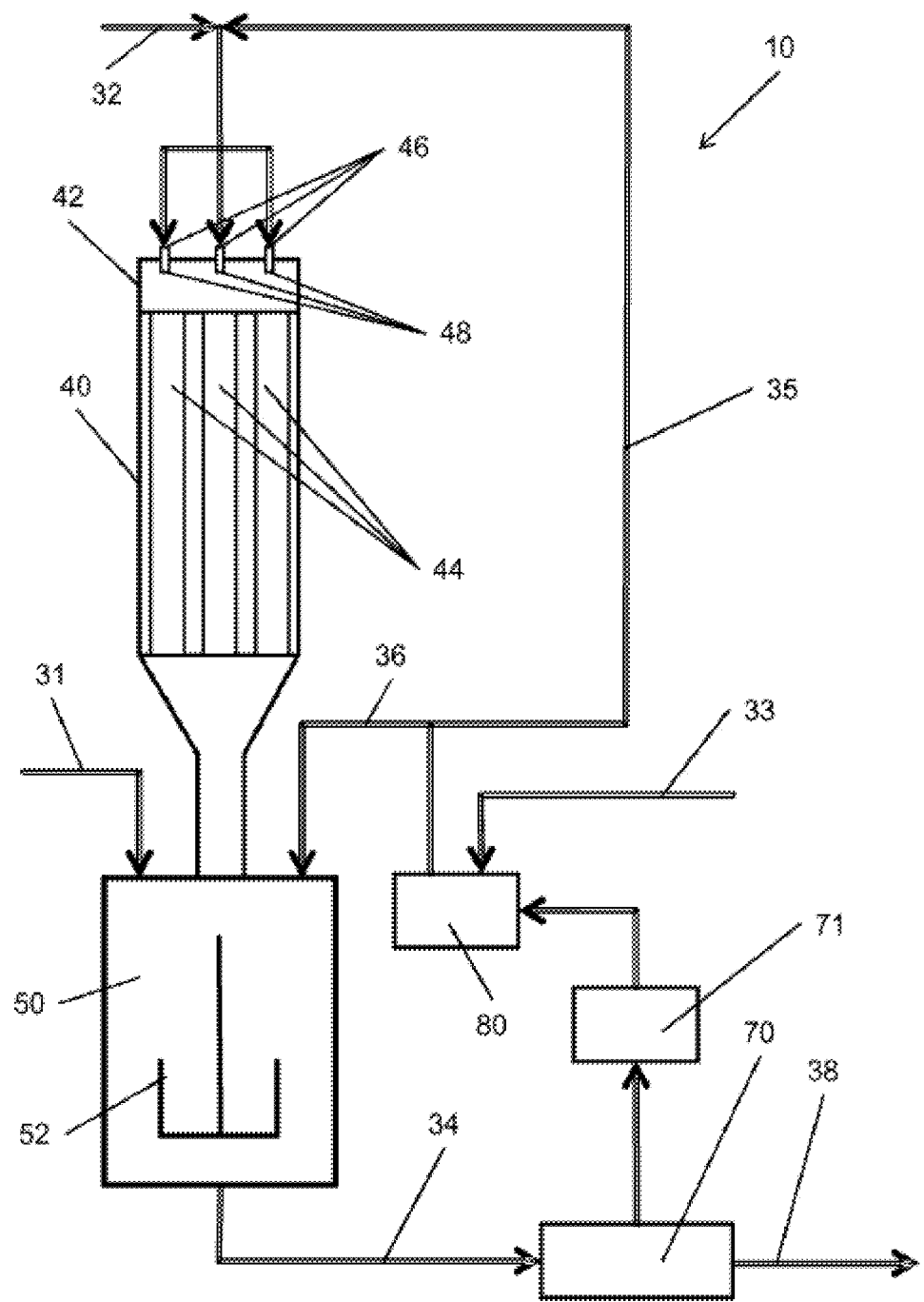

METHOD AND SYSTEM FOR PRODUCING A POLYMER

The invention relates to a process for producing a polymer from at least one first component and a second component by means of a reactor, where heat of reaction arising in the reactor is removed by means of an evaporative cooler by feeding gaseous vapor formed in the reactor to the evaporative cooler and recirculating condensed vapor from the evaporative cooler to the reactor. The invention also relates to a system for producing a polymer from at least one first component and a second component, which comprises a reactor and an evaporative cooler for removing heat of reaction arising in the reactor.

The production of polymers, in particular copolymers such as styrene-acrylonitrile copolymer (SAN) or alpha-methylstyrene-acrylonitrile copolymer (AMSAN) in a reactor having a stirrer is known. Such a reactor is also referred to as "CSTR" (continuous stirred tank reactor) in the literature. Here, at least two components, in particular monomers, are fed to the reactor and a polymerization then takes place within the reactor.

EP-B 1297038 discloses the production of rubber-containing styrene polymers such as acrylonitrile-butadiene-styrene (ABS) or acrylonitrile-styrene-acrylate (ASA) composed of a rubber phase and a hard phase. Suitable hard phases here are, in particular, styrene-acrylonitrile copolymer (SAN) and alpha-methylstyrene-acrylonitrile copolymer (AMSAN). The hard phase is produced by polymerization of monomers.

A thermoplastic molding composition comprising, inter alia, a terpolymer as component is known from EP-B 2802619. The terpolymer here contains acrylonitrile (AN), alpha-methylstyrene and styrene (S). The terpolymer is produced by reacting the monomers in a free-radical solvent polymerization at temperatures of from 100° C. to 140° C. and subsequently reducing the residual monomer content to less than 3000 ppm at a pressure of less than 50 mbar in a shell-and-tube reactor.

A reactor for polymerization is disclosed, for example, in EP-A 0865820. The reactor comprises a lid, a bottom and a stirrer. The reactor comprises feed conduits via which the components are introduced into the reactor. The polymerization takes place in the reactor and the polymer formed is taken from the reactor via discharge conduits.

The polymerization is generally an exothermic reaction, and heat of reaction arises. The heat of reaction which arises is, for example, removed by means of an evaporative cooler. As evaporative cooler, preference is given to a shell-and-tube heat exchanger. In the evaporative cooler, the gaseous vapor formed in the reactor ascends in tubes. A coolant flows around the tubes. As a result, the vapor condenses and the condensed vapor is recirculated to the reactor.

In the production of the polymer, polymer is also formed in the evaporative cooler. The tubes of the evaporative cooler can become blocked by the polymer formed. As a result, the flow of the vapor from the reactor through the evaporative cooler is hindered, and the removal of the heat of reaction from the reactor is also made difficult.

It is an object of the invention to reduce or avoid the formation of polymer in the evaporative cooler in the production of a polymer by means of a reactor and an evaporative cooler.

This object is achieved according to the invention by a process for producing a polymer from at least one first component and a second component having the features of claim 1.

In a generic process for producing a polymer from at least one first component and a second component by means of a reactor, heat of reaction arising in the reactor is removed by means of an evaporative cooler by feeding gaseous vapor formed in the reactor to the evaporative cooler and recirculating condensed vapor from the evaporative cooler to the reactor.

According to the invention, the first component and/or the second component are at least partly introduced via the evaporative cooler and the first component and/or second component introduced into the evaporative cooler go from the evaporative cooler into the reactor.

The invention provides, in particular, a process for producing a (co)polymer from at least one first component and a second component by means of a reactor (50), where heat of reaction arising in the reactor (50) is removed by means of an evaporative cooler (40),
by feeding gaseous vapor formed in the reactor (50) to the evaporative cooler (40) and recirculating condensed vapor from the evaporative cooler (40) to the reactor (50), wherein the first component and/or the second component are at least partly introduced via the evaporative cooler (40) and go from the evaporative cooler (40) into the reactor (50).

Often, the first component contains styrene (or consists thereof), and the second component contains acrylonitrile (or consists thereof).

It has surprisingly been found that the operating time of the evaporative cooler can be increased significantly when the first component and/or second component are at least partly introduced into the evaporative cooler and go from the evaporative cooler into the reactor. In processes known from the prior art, the components are introduced directly into the reactor. The operating time is here the time during which polymer is produced by means of the reactor and the evaporative cooler. In the present case, the operating time ends when so much polymer has been formed in the evaporative cooler that the flow of the vapor from the reactor through the evaporative cooler is hindered and the polymer formed therefore has to be removed from the evaporative cooler.

The first component and the second component from which the (co)polymer is produced contain, in particular, monomers. Such monomers are, for example, firstly styrene and/or alpha-methylstyrene and secondly acrylonitrile and/or methacrylic esters.

The process of the invention can be used advantageously for producing styrene-acrylonitrile copolymer (SAN). In this case, the first component contains styrene (or consists thereof), and the second component contains acrylonitrile (or consists thereof). Preferred mixing ratios (w/w) are from 90 parts of styrene:10 parts of acrylonitrile to 60 parts of styrene:40 parts of acrylonitrile.

The process of the invention can also advantageously be used for producing alpha-methylstyrene-acrylonitrile copolymer (AMSAN). In this case, the second component contains acrylonitrile and the first component contains alpha-methylstyrene. Preferred mixing ratios here are from 80 parts of alpha-methylstyrene:20 parts of acrylonitrile to 60 parts of alpha-methylstyrene:40 parts of acrylonitrile.

The process of the invention can also advantageously be used for producing styrene-methyl methacrylate copolymer (SMMA). In this case, the first component contains styrene and the second component contains methyl methacrylate (MMA).

It is also conceivable for more than two components, or more than two monomers, to be used. In particular, terpolymers composed of three monomers can be produced by means of the process of the invention. For example, a terpolymer composed of the monomers acrylonitrile, styrene and alpha-methylstyrene can be produced by means of the process of the invention.

In a preferred embodiment of the invention, the first component and/or the second component are at least partly introduced from above through a cap of the evaporative cooler into the evaporative cooler. The cap of the evaporative cooler is arranged in an upper region and closes the evaporative cooler off at the top. The first component and/or the second component are thus introduced under the force of gravity into the evaporative cooler and drop under the force of gravity into the evaporative cooler.

In a particularly preferred embodiment of the invention, the first component and/or the second component are at least partly introduced from above into a plurality of vertical tubes of the evaporative cooler. The vapor ascending from the reactor condenses in these tubes. The first component and/or the second component are thus introduced into the evaporative cooler in such a way that the first component and/or the second component drop into said tubes.

The gaseous vapor formed in the polymerization taking place in the reactor ascends against the force of gravity in the vertical tubes of the evaporative cooler and condenses in the evaporative cooler. The condensed vapor subsequently flows together with the first component and/or the second component under the force of gravity back into the reactor.

The first component and/or the second component are preferably introduced at least partly in liquid form into the evaporative cooler. The first component and/or the second component thus flow into the evaporative cooler.

The first component and/or the second component are particularly preferably at least partly mixed with a solvent. Solvents used are, for example, ethylbenzene (EB) and toluene. A further suitable solvent is methyl ethyl ketone.

In a preferred development of the invention, the solvent is taken off from a condensation unit arranged downstream of the reactor, preferably via a collection vessel. Unreacted monomers of the first component and of the second component are also taken off from the condensation unit, preferably via the collection vessel.

The solvent is, after condensation, recirculated together with the condensed, unreacted monomers of the first component and/or of the second component to the reactor. The solvent is thus continually circulated.

In an advantageous development of the invention, the first component and/or the second component are partly introduced directly into the reactor.

The object is also achieved according to the invention by a system for producing a polymer from at least one first component and a second component having the features of claim 10.

A generic system for producing a polymer from at least one first component and a second component comprises a reactor in which the polymerization takes place and an evaporative cooler for removing heat of reaction arising in the reactor. The reactor is connected to the evaporative cooler in such a way that heat of reaction arising in the reactor is removed by means of the evaporative cooler by feeding gaseous vapor formed in the reactor to the evaporative cooler and recirculating condensed vapor from the evaporative cooler to the reactor.

According to the invention, the evaporative cooler has at least one feed opening for introducing the first component and/or the second component. The first component and/or second component introduced into the evaporative cooler thus go from the evaporative cooler into the reactor.

It has been discovered that the operating time of the evaporative cooler can be increased significantly when the first component and/or second component are at least partly introduced through the feed opening into the evaporative cooler and go from the evaporative cooler into the reactor. In processes known from the prior art, the components are introduced directly into the reactor.

The at least one feed opening is preferably arranged in a cap of the evaporative cooler. The cap of the evaporative cooler is arranged in an upper region and closes the evaporative cooler off at the top. The first component and/or the second component can thus be introduced from above through the cap of the evaporative cooler into the evaporative cooler and drop under the force of gravity into the evaporative cooler.

In an advantageous embodiment of the invention, nozzles are installed in the cap of the evaporative cooler. The nozzles are arranged in such a way that the first component and/or second component introduced through the at least one feed opening drop from above into vertical tubes of the evaporative cooler and are preferably distributed over all tubes. The vapor ascending from the reactor condenses in these tubes.

In an advantageous development of the invention, a return conduit for feeding a solvent from a condensation unit arranged downstream of the reactor into the evaporative cooler is provided.

The mixture of solvent and condensed, unreacted monomers flows together with the first component and/or second component into the evaporative cooler. From there, the solvent flows together with the dissolved first component and/or second component into the reactor and further into the degassing unit arranged downstream of the reactor. The solvent is thus continually circulated.

The reactor and the evaporative cooler are advantageously arranged in such a way that gaseous vapor formed in the reactor ascends against the force of gravity into the evaporative cooler, condenses there and vapor condensed in the evaporative cooler flows together with the first component and/or the second component under the force of gravity into the reactor.

Styrene-acrylonitrile copolymer (SAN), alpha-methylstyrene-acrylonitrile copolymer (AMSAN) or styrene-methyl methacrylate copolymer (SMMA), in particular, but also other polymers and copolymers can be advantageously produced by means of the process of the invention and by means of the system of the invention.

Embodiments of the invention are explained in more detail with the aid of the following drawing, the following description and the claims.

FIG. 1 shows a schematic sectional view of a system for producing a polymer such as SAN.

A schematic sectional view of a system 10 for producing a polymer from at least one first component and a second component is depicted in FIG. 1. The system 10 serves, in particular but not exclusively, for producing styrene-acrylonitrile copolymer (SAN), alpha-methylstyrene-acrylonitrile copolymer (AMSAN) and styrene-methyl methacrylate copolymer (SMMA).

The system 10 comprises a reactor 50. In the reactor 50, a polymerization of monomers fed in takes place. A stirrer 52 is arranged within the reactor 50. The stirrer 52 can be driven rotationally by means of an electric motor which is not shown here. Other types of reactors 50 in which a polymerization of monomers fed in can take place can also be used.

A first feed conduit 31 is connected to the reactor 50. The first feed conduit 31 serves for the introduction of components directly into the reactor 50. The components introduced contain, in particular, monomers. A first return conduit 36 is also connected to the reactor 50. The first return conduit 36 serves for the introduction of a solvent and also of unreacted monomers separated off during degassing. The solvent originates from a condensation unit 71, which will be discussed at a later juncture.

Furthermore, an outlet conduit 34 is connected to the reactor 50. Polymer composition formed in the reactor 50 can be drained from the reactor by means of the outlet conduit 34. A degassing unit 70 is arranged upstream of the reactor 50 and connected to the outlet conduit 34. Polymer composition drained from the reactor 50 via the outlet conduit 34 thus goes into the degassing unit 70 arranged downstream.

The degassing unit 70 serves, in particular, for removing volatile constituents from the polymer composition, in particular solvent and unreacted monomers. An offtake conduit 38 is connected to the degassing unit 70. The polymer produced, which is now at least largely free of unreacted monomers and solvent, can be taken from the system 10 via the offtake conduit 38.

The degassing unit 70 is also connected to a condensation unit 71. Solvent and unreacted monomers which have been removed from the polymer composition in the degassing unit 70 are fed into the condensation unit 71. The solvent and the unreacted monomers condense in the condensation unit 71.

The condensation unit 71 is connected to a collection vessel 80. The condensed solvent and the condensed unreacted monomers from the condensation unit 71 are fed into the collection vessel 80. A feed conduit 33 is also connected to the collection vessel 80 and serves for introducing or introducing further amounts of solvent.

The first return conduit 36 which is connected to the reactor 50 and serves for introduction of the solvent and the unreacted monomers into the reactor 50 is also connected to the collection vessel 80. The solvent present in the collection vessel 80 and also the unreacted monomers can thus be recirculated in their entirety or partly via the first return conduit 36 into the reactor 50.

The system 10 further comprises an evaporative cooler 40. The evaporative cooler 40 serves for removing heat of reaction arising in the polymerization in the reactor 50. The evaporative cooler 40 is in the present case configured as shell-and-tube heat exchanger and comprises a plurality of vertical tubes 44. The evaporative cooler 40 is closed, i.e. at the end facing away from the ground, by a cap 42. Furthermore, the evaporative cooler 40 comprises a coolant inlet which is not shown here and a coolant outlet which is likewise not shown here.

The reactor 50 is connected to the evaporative cooler 40 in such a way that the heat of reaction arising during the polymerization in the reactor 50 can be removed by means of the evaporative cooler 40. Gaseous vapor formed in the reactor 50 is fed to the evaporative cooler 40 and condensed vapor flows from the evaporative cooler 40 back into the reactor 50.

Within the evaporative cooler 40, the gaseous vapor formed in the reactor 50 ascends in the vertical tubes 44. A coolant flows around the tubes 44. The coolant is fed to the evaporative cooler 40 through the coolant inlet, flows around the vertical tubes 44 and exits again from the evaporative cooler 40 through the coolant outlet. In the process, the coolant cools the tubes 44 and also vapor from the reactor 50 which is present therein.

As a result, the vapor condenses and the condensed vapor flows back into the reactor 50.

One or more feed openings 46 are arranged in the cap 42 of the evaporative cooler 40. The feed openings 46 in the cap 42 of the evaporative cooler 40 serve for introducing components into the evaporative cooler 40. Furthermore, a plurality of nozzles 48 can be provided in the cap 42 of the evaporative cooler 40. The nozzles 48 are connected to the feed openings 46. Components which are introduced into the cap 42 of the evaporative cooler 40 through the feed openings 46 thus go to the nozzles 48 in the cap 42 of the evaporative cooler 40.

The nozzles 48 are arranged in the cap 42 of the evaporative cooler 40 in such a way that components which are introduced through the feed openings 46 into the evaporative cooler 40 are distributed from above over all vertical tubes 44 of the evaporative cooler 40. The components introduced through the feed openings 46 into the evaporative cooler 40 thus drop under the force of gravity into the vertical tubes 44 of the evaporative cooler 40 in which the vapor from the reactor 50 condenses.

A second feed conduit 32 is connected to the cap 42 of the evaporative cooler 40. The second feed conduit 32 serves for introduction of components into the evaporative cooler 40. The components fed in contain in particular monomers. The second feed conduit 32 is connected to the feed openings 46 in the cap 42 of the evaporative cooler 40. Components introduced via the second feed conduit 32 thus go via the feed openings 46 to the nozzles 48 in the cap 42 of the evaporative cooler 40 and from there into the vertical tubes 44.

A second return conduit 35 opens into the second feed conduit 32. The second return conduit 35 is, like the first return conduit 36, connected to the collection vessel 80. Thus, the solvent present in the collection vessel 80 and also the unreacted monomers can be fed in their entirety or partly into the second feed conduit 32 via the second return conduit 35. The second return conduit 35 thus serves for introduction of a solvent and of the unreacted monomers into the evaporative cooler 40.

In the reactor 50, a polymerization of the monomers takes place while stirring by means of the stirrer 52. Heat of reaction arises in the polymerization. The heat of reaction results in gaseous vapor ascending from the reactor 50 into the evaporative cooler 40.

The gaseous vapor formed in the reactor 50 ascends in the vertical tubes 44 of the evaporative cooler 40 and is cooled there. As a result, the vapor condenses and the condensed vapor flows back into the reactor 50.

The polymer composition formed in the polymerization has a solids content of about 50%-80%, preferably 60%-70%. The polymer composition is then fed via the outlet conduit 34 to the degassing unit 70. In the degassing unit 70, the volatile constituents, in particular solvent and unreacted monomers, are removed from the polymer composition. The polymer produced, which is now largely free of volatile constituents, is taken off from the system 10 via the offtake conduit 38. The solvent removed from the polymer composition and also the unreacted monomers are conveyed through the condensation unit 71 and the collection vessel 80 and recirculated in their entirety or partly via the first return conduit 36 back into the reactor 50 or recirculated in their entirety or partly via the second return conduit 35 back into the evaporative cooler 40.

The components are present in liquid form. The components are introduced through the feed openings 46 in the cap 42 of the evaporative cooler 40 into the evaporative cooler 40. The components are distributed into the vertical tubes 44 of the evaporative cooler 40 via the nozzles 48 in the cap 42 of the evaporative cooler 40. Here, the components drop from above under the force of gravity into the vertical tubes 44 of the evaporative cooler 40.

Due to the heat of reaction which arises as a result of the polymerization in the reactor 50, gaseous vapor also ascends against the force of gravity from the reactor 50 into the vertical tubes 44 of the evaporative cooler 40. There, the vapor is cooled and condenses. In the process, mixing of the condensed vapor with the components which are introduced from above under the force of gravity into the vertical tubes 44 of the evaporative cooler 40 takes place. The condensed vapor subsequently flows together with the components introduced into the evaporative cooler 40 back into the reactor 50 under the force of gravity. The solvent also flows from the evaporative cooler 40 into the reactor 50.

The process described here for producing a polymer is based on a continuous procedure.

The components are introduced continuously in their entirety or at least partly via the second feed conduit 32 into the evaporative cooler 40, or not more than partly introduced via the first feed conduit 31 into the reactor 50.

The polymer produced is likewise taken off continuously via the offtake conduit 38. The solvent is circulated in the system 10. The solvent is conveyed from the condensation unit 71 via the first return conduit 36 into the reactor 50 or via the second return conduit 35 into the evaporative cooler 40.

The invention is explained in more detail by the examples and claims.

In a process known from the prior art for producing a polymer, the components (styrene and acrylonitrile) are introduced exclusively directly into the reactor 50. The polymer produced is taken off continuously.

After a number of months up to two years, so much polymer (SAN) has been formed in the evaporative cooler that the cooling power is significantly reduced and that efficient temperature management is no longer ensured. An operating time in the range from one to two years is frequently obtained.

In an experiment on production of a polymer (SAN) by means of the process of the invention in a system 10 according to the invention, the components are introduced in their entirety or partly into the evaporative cooler 40. The polymer produced is taken off continuously. In the present case, it took about five years until so much polymer had been formed in the evaporative cooler that the flow of the vapor from the reactor 50 through the evaporative cooler 40 was significantly hindered. An operating time of five years was thus obtained.

LIST OF REFERENCE NUMERALS

10 System
31 First feed conduit
32 Second feed conduit
33 Feed conduit
34 Outlet conduit
35 Second return conduit
36 First return conduit
38 Offtake conduit
40 Evaporative cooler
42 Cap
44 Tube
46 Feed opening
48 Nozzle
50 Reactor
52 Stirrer
70 Degassing unit
71 Condensation unit
80 Collection vessel

The invention claimed is:

1. A process for producing a (co)polymer from at least one first component and a second component by a reactor, where
   heat of reaction arising in the reactor is removed by an evaporative cooler by feeding gaseous vapor formed in the reactor to the evaporative cooler and recirculating condensed vapor from the evaporative cooler to the reactor,
   wherein the first component and the second component are at least partly introduced via the evaporative cooler and go from the evaporative cooler into the reactor,
   wherein the first component and the second component are at least partly mixed with a solvent, with the solvent being taken from a condensation unit arranged downstream of the reactor, the gaseous vapor ascending against the force of gravity in vertical tubes of the evaporative cooler and condensing in the evaporative cooler, and with the condensed vapor subsequently flowing together with the first component and the second component under the force of gravity back into the reactor.

2. The process of claim 1, wherein the first component contains styrene and wherein the second component contains acrylonitrile.

3. The process of claim 1, wherein the second component contains acrylonitrile and wherein the first component contains alpha-methylstyrene.

4. The process of claim 1, wherein the first component contains styrene and wherein the second component contains methyl methacrylate.

5. The process of claim 1, wherein the first component and/or the second component are introduced at least partly from above through a cap of the evaporative cooler.

6. The process of claim 1, wherein the first component and/or the second component are at least partly introduced from above into a plurality of vertical tubes of the evaporative cooler.

7. The process of claim 1, wherein the first component and/or the second component are introduced at least partly in liquid form into the evaporative cooler.

8. The process of claim 7, wherein the solvent is taken via a collection vessel from the condensation unit arranged downstream of the reactor.

9. The process of claim 1, wherein the first component and/or the second component are at least partly introduced directly into the reactor.

10. A system for producing a polymer from at least one first component and a second component, comprising:
   a reactor, and
   an evaporative cooler for removing heat of reaction arising in the reactor,
   wherein the evaporative cooler has at least one feed opening for introducing the first component and/or the second component,
   wherein a return conduit for feeding a solvent from a condensation unit arranged downstream of the reactor into the evaporative cooler is provided,
   wherein the reactor and the evaporative cooler are arranged in such a way that vapor formed in the reactor ascends against the force of gravity into the evaporative cooler and that vapor condensed in the evaporative cooler flows together with the first component and/or the second component under the force of gravity into the reactor.

11. The system of claim 10, wherein the at least one feed opening is arranged in a cap of the evaporative cooler.

12. The system of claim 11, wherein nozzles are arranged in the cap in such a way that the first component and/or second component introduced through the at least one feed opening are distributed from above into vertical tubes of the evaporative cooler.

13. The system of claim 10, wherein the return conduit is connected to a collection vessel and wherein the condensation unit is connected to the collection vessel.

* * * * *